US012745003B2

(12) United States Patent
Karpushin et al.

(10) Patent No.: US 12,745,003 B2
(45) Date of Patent: Sep. 22, 2026

(54) SYSTEMS AND METHODS FOR CHANGING STABILIZATION OF VIDEOS

(71) Applicant: GoPro, Inc., San Mateo, CA (US)

(72) Inventors: Maxim Karpushin, Paris (FR); Thomas Derbanne, Paris (FR)

(73) Assignee: GoPro, Inc., San Mateo, CA (US)

( * ) Notice: Subject to any disclaimer, the term of this patent is extended or adjusted under 35 U.S.C. 154(b) by 173 days.

(21) Appl. No.: 18/890,600

(22) Filed: Sep. 19, 2024

(65) Prior Publication Data

US 2025/0016447 A1 Jan. 9, 2025

Related U.S. Application Data

(63) Continuation of application No. 18/364,767, filed on Aug. 3, 2023, now Pat. No. 12,126,903, which is a continuation of application No. 17/901,110, filed on Sep. 1, 2022, now Pat. No. 11,722,772, which is a continuation of application No. 16/946,398, filed on Jun. 19, 2020, now Pat. No. 11,477,381.

(60) Provisional application No. 62/864,637, filed on Jun. 21, 2019.

(51) Int. Cl.
*H04N 23/68* (2023.01)
*G06T 7/215* (2017.01)
*G06T 7/246* (2017.01)

(52) U.S. Cl.
CPC .......... *H04N 23/683* (2023.01); *G06T 7/215* (2017.01); *G06T 7/246* (2017.01); *H04N 23/6811* (2023.01); *H04N 23/6812* (2023.01); *G06T 2207/10016* (2013.01)

(58) Field of Classification Search
CPC ............ H04N 23/683; H04N 23/6811; H04N 23/6812; G06T 7/215; G06T 7/246; G06T 2207/10016
See application file for complete search history.

(56) References Cited

U.S. PATENT DOCUMENTS

| | | | | |
|---|---|---|---|---|
| 10,917,573 | B1 * | 2/2021 | Stimm | H04N 23/681 |
| 11,064,118 | B1 * | 7/2021 | Rahmouni | H04N 5/2628 |
| 11,477,381 | B1 | 10/2022 | Karpushin | |
| 11,722,772 | B2 | 8/2023 | Karpushin | |
| 2013/0182134 | A1 * | 7/2013 | Grundmann | H04N 23/683 348/208.6 |
| 2017/0041545 | A1 * | 2/2017 | Murgia | H04N 23/6812 |
| 2022/0417438 | A1 | 12/2022 | Karpushin | |
| 2023/0379581 | A1 | 11/2023 | Karpushin | |

* cited by examiner

*Primary Examiner* — Lin Ye
*Assistant Examiner* — Tuan H Le
(74) *Attorney, Agent, or Firm* — Esplin & Associates, PC

(57) ABSTRACT

A video including visual content may be captured by an image capture device in motion. Stabilization performance information for the visual content may be determined. The stabilization performance information may characterize an extent to which desired stabilization is able to be performed using the visual content. The stabilization for the visual content may be changed based on the stabilization performance information.

20 Claims, 6 Drawing Sheets

SYSTEMS AND METHODS FOR CHANGING STABILIZATION OF VIDEOS

FIELD

This disclosure relates to changing stabilization of videos based on stabilization performance.

BACKGROUND

A video may have been captured by an image capture device in motion. The motion of the image capture device during the capture of the video may cause the video to appear jerky/shaky. Different amount of image capture device motion (e.g., shakiness) during capture of the video may change the extent to which desired stabilization of the video may be achieved.

SUMMARY

This disclosure relates to changing stabilization of videos. Video information and/or other information may be obtained. The video information may define a video. The video may include video content having a progress length. The video content may include visual content captured by an image capture device during a capture duration. The visual content may have a field of view. Stabilization performance information for the visual content may be determined. The stabilization performance information may characterize an extent to which desired stabilization is able to be performed using the visual content. A change in stabilization for the visual content may be effectuated based on the stabilization performance information and/or other information.

A system that changes stabilization of videos may include one or more electronic storages, one or more processors, and/or other components. An electronic storage may store video information defining a video, information relating to the video, information relating to video content, information relating to visual content, information relating to an image capture device, information relating to a capture duration, information relating to stabilization of visual content, stabilization performance information, information relating to desired stabilization, information relating to change in stabilization, and/or other information. In some implementations, the system may include one or more optical elements, one or more image sensors, one or more position sensors, and/or other components.

One or more components of the system may be carried by a housing, such as a housing of an image capture device. For example, the optical element(s), the image sensor(s), and/or the position sensor(s) of the system may be carried by the housing of an image capture device. The housing may carry other components, such as the processor(s) and/or the electronic storage.

The processor(s) may be configured by machine-readable instructions. Executing the machine-readable instructions may cause the processor(s) to facilitate changing stabilization of videos. The machine-readable instructions may include one or more computer program components. The computer program components may include one or more of a video information component, a stabilization performance component, a change component, and/or other computer program components.

The video information component may be configured to obtain video information and/or other information. Video information may define a video. The video may include video content having a progress length. The video content may include visual content captured by an image capture device during a capture duration. The visual content may have a field of view.

The stabilization performance component may be configured to determine stabilization performance information for the visual content and/or other information. The stabilization performance information may characterize an extent to which desired stabilization is able to be performed using the visual content and/or other information.

In some implementations, the stabilization for the visual content may be performed using a punchout of the visual content and/or other information. The punchout of the visual content may include extents of the visual content within a viewing window. The viewing window may be located within the field of view of the visual content. In some implementations, location of the viewing window within the field of view of the visual content may be determined based on rotational positions of the image capture device during the capture duration and/or other information.

In some implementations, the extent to which the desired stabilization is able to be performed using the visual content may include a frequency with which the desired stabilization requires the viewing window to extend beyond the field of view of the visual content. The extent to which the desired stabilization is able to be performed using the visual content may include a spatial amount by which the desired stabilization requires the viewing window to extend beyond the field of view of the visual content.

In some implementations, the stabilization performance information for the visual content may be determined based on an orientation of the viewing window with respect to the field of view of the visual content.

The change component may be configured to effectuate one or more changes in stabilization for the visual content based on the stabilization performance information and/or other information. In some implementations, a change in the stabilization for the visual content may include a change in one or more stabilization parameters. In some implementations, a change in the stabilization for the visual content may include a change in the field of view of the visual content. In some implementations, a change in the stabilization for the visual content may include a change in the viewing window. A change in the viewing window may include a change in a size and/or a shape of the viewing window.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
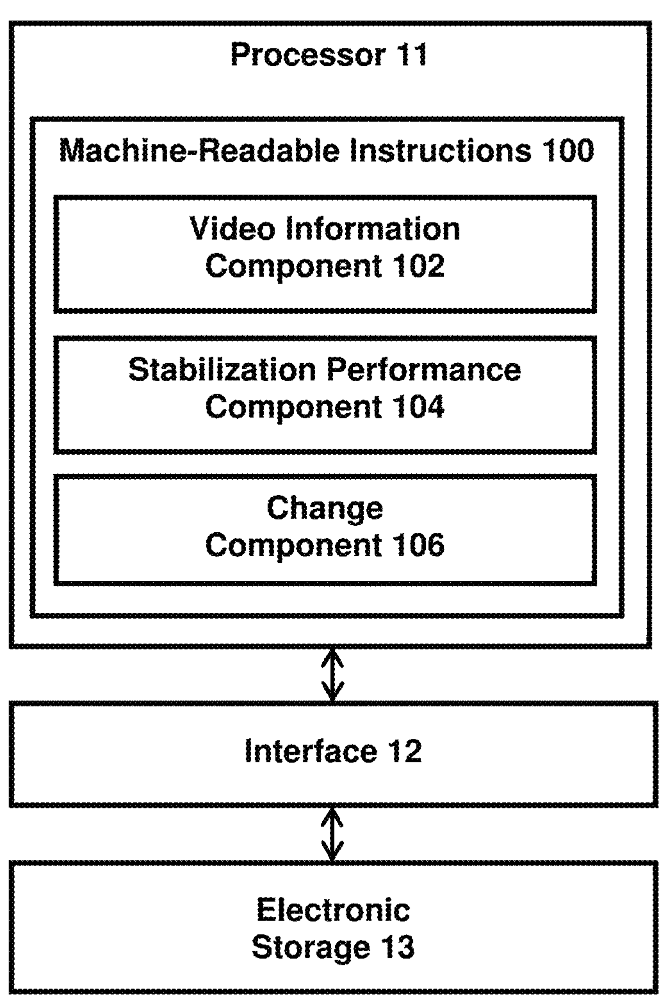
FIG. 1 illustrates an example system that changes stabilization of videos.

FIG. 1 illustrates a system 10 for changing stabilization of videos. The system 10 may include one or more of a processor 11, an interface 12 (e.g., bus, wireless interface), an electronic storage 13, and/or other components. In some implementations, the system 10 may include one or more optical elements, one or more image sensors, one or more position sensors, and/or other components. Video information and/or other information may be obtained by the processor 11. The video information may define a video. The video may include video content having a progress length. The video content may include visual content captured by an image capture device during a capture duration. The visual content may have a field of view. Stabilization performance information for the visual content may be determined. The stabilization performance information may characterize an extent to which desired stabilization is able to be performed using the visual content. A change in stabilization for the visual content may be effectuated based on the stabilization performance information and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information defining a video, information relating to the video, information relating to video content, information relating to visual content, information relating to an image capture device, information relating to a capture duration, information relating to stabilization of visual content, stabilization performance information, information relating to desired stabilization, information relating to change in stabilization, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate changing stabilization of videos. The machine-readable instructions 100 may include one or more computer program components. The machine-readable instructions 100 may include one or more of a video information component 102, a stabilization performance component 104, a change component 106, and/or other computer program components.

Visual content (of image(s), of video frame(s), of video(s)) with a field of view may be captured by an image capture device during a capture duration. Visual content may refer to content of image(s), video frame(s), and/or video(s) that may be consumed visually. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, optical element(s), image sensor(s), and/or position sensor(s) of the system 10 may be carried by the housing of the image capture device. The housing may carry other components, such as the processor 11 and/or the electronic storage 13. References to a housing of an image capture device may refer to the image capture device, and vice versa. For example, references to position/motion of a housing of an image capture device may refer to position/motion of the image capture device, and vice versa.

Figure 3:
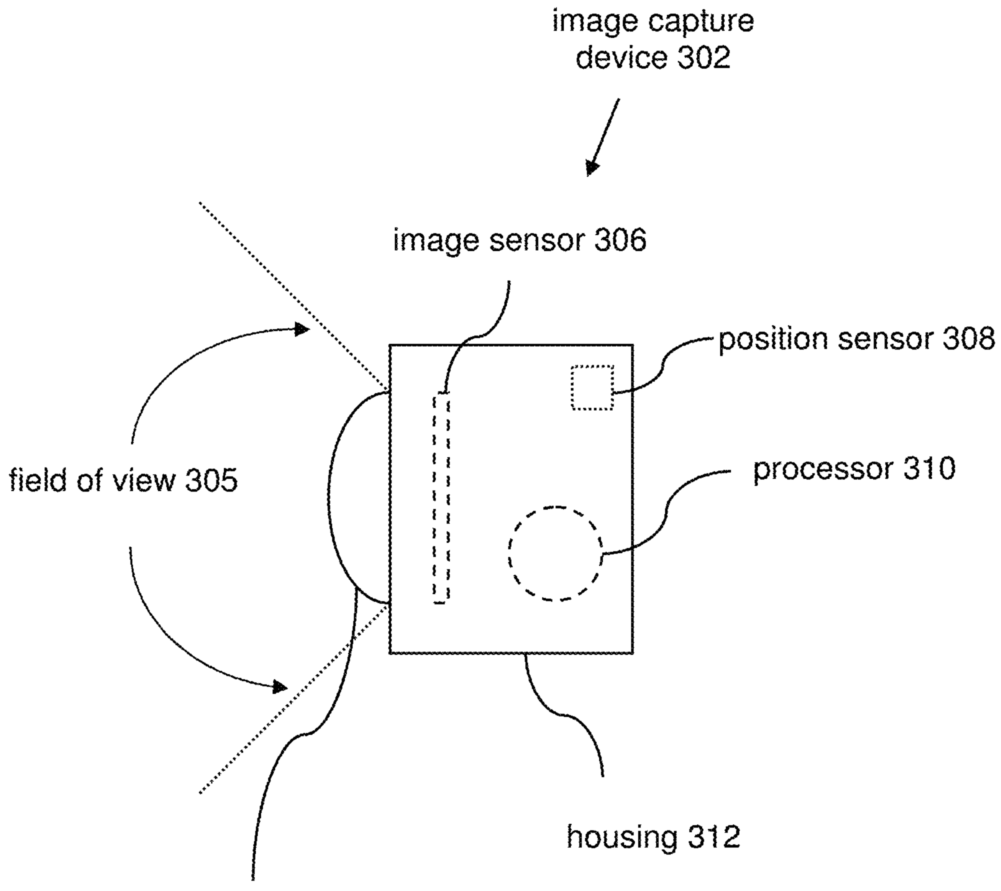
FIG. 3 illustrates an example image capture device.

An image capture device may refer to a device for recording visual information in the form of images, videos, and/or other media. An image capture device may be a standalone device (e.g., camera) or may be part of another device (e.g., part of a smartphone, tablet). FIG. 3 illustrates an example image capture device 302. The image capture device 302 may include a housing 312, and the housing 312 may carry (be attached to, support, hold, and/or otherwise carry) an optical element 304, an image sensor 306, a position sensor 308, a processor 310, and/or other components. In some implementations, an image capture device may include multiple optical elements and/or multiple image sensors. The combined field of view of the optical elements may include a spherical field of view. The multiple optical elements and/or multiple image sensors may be used to capture spherical visual content. Spherical visual content may include a spherical field of view. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306. The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than or equal to 180-degrees. In some implementations, the field of view 305 may be smaller than or equal to 180-degrees.

The image sensor 306 may include sensor(s) that converts received light into output signals. The output signals may include electrical signals. For example, the image sensor 306 may include one or more of a charge-coupled device sensor, an active pixel sensor, a complementary metal-oxide semiconductor sensor, an N-type metal-oxide-semiconductor sensor, and/or other image sensors. The image sensor 306 may generate output signals conveying information that defines visual content of one or more images and/or one or more video frames of a video. For example, the image sensor 306 may be configured to generate a visual output signal based on light that becomes incident thereon during a capture duration. The visual output signal may convey visual information that defines visual content having the field of view.

The position sensor 308 may include sensor(s) that measures experienced positions and/or motions. The position sensor 308 may convert experienced positions and/or motions into output signals. The output signals may include electrical signals. For example, the position sensor 308 may refer to a set of position sensors, which may include one or more inertial measurement units, one or more accelerometers, one or more gyroscopes, and/or other position sensors. The position sensor 308 may generate output signals conveying information that characterizes positions and/or motions of the position sensor 308 and/or device(s) carrying the position sensor 308, such as the image capture device 302 and/or the housing 312.

For example, the position sensor 308 may be configured to generate a position output signal based on positions of the image capture device 302 during the capture duration. The position output signal may convey position information that characterizes positions of the image capture device 302 at different moments (points in time, time durations) within the capture duration. The position information may characterize positions of the image capture device 302 as the function of progress through the capture duration. The position information may characterize positions of the image capture device 302 based on specific translational and/or rotational positions of the image capture device 302 and/or based on changes in translational and/or rotational positions of the image capture device 302 as a function of progress through the capture duration. That is, the position information may characterize translational and/or rotational positions of the image capture device 302 and/or changes in translational and/or rotational positions (motion) of the image capture device 302 (e.g., direction, amount, velocity, acceleration) during the capture duration. In some implementations, the position information may characterize translational and/or rotational positions of the image capture device 302 by characterizing changes in translational and/or rotational positions (motion) of the image capture device 302 during the capture duration, and vice versa.

In some implementations, the position information may be determined based on signals generated by the position sensor 308 and independent of the information/signals generated by the image sensor 306. That is, position information may be determined without using visual content/images/videos generated by the image sensor 306. Use of visual content/images/videos to determine positions/motions of the image capture device 302 may be computationally expensive in terms of processing power, processing time, and/or battery consumption. Using the information/signals from the position sensor 308 to determine positions/motions of image capture device 302 may be computationally cheaper. That is, less processing power, processing time, and/or battery consumption may be required when positions/motions of the image capture device 302 are determined from the information/signals from the position sensor 308 than the information/signals from the image sensor 306. The position information determined independent of the visual information may be used to determine the positions of the image capture device 302 during the capture duration. In some implementations, the position information may be determined based on the visual content and/or other information/signals from the image sensor 306. For example, optical flow and/or other pixel characteristic analysis may be performed to estimate the positions of the image capture device 302 as the function of progress through the capture duration.

In some implementations, the position information may include data from the position sensor (e.g., gyroscope data, accelerometer data) with time stamps per visual content capture at different moments. For example, the position may include gyroscope data and/or accelerometer data per individual video frames captured by the image capture device. In some implementations, calibration of an inertial measurement unit may be used to combine different data within the position information.

Motion of the image capture device 302 during visual content capture may result in motion within the visual content. For example, shaking of the image capture device 302 during visual content capture may result in shaky motion within the captured visual content. Such motion within the visual content may be unintentional and/or not be desirable. Stabilization of visual content may include reduction/removal of motion present in the visual content due to motion (e.g., mechanical displacement, rotational motion, translational motion) of the image capture device 302 during visual content capture.

The field of view 305 may be larger than a size of the punchout/viewing window used to generate stabilized visual content. Portions of the visual content captured from light within the field of view 305 may be presented on a display and/or used to generate a video. The portions of the visual content presented on the display/used to generate a video may include those portions of the visual content within a viewing window. A viewing window may define extents of the visual content (e.g., of image(s)/video frame(s)) to be included within a punchout. The viewing window may be determined so that the visual content within the presentation/generated video does not include or includes less motion than the visual content.

For instance, the visual content may include shaky/jerky footage due to motion of the image capture device 302 during visual content capture, and the viewing window may be determined so that the portion of the visual content that is presented/used for video generation does not appear shaky/jerky or appears less shaky/jerky. That is, a punchout/viewing window may be used to stabilize visual content captured by the image capture device 302. For example, the shape, size, and/or the location of the viewing window within the field of view of the visual content may be determined to compensate for motion of the image capture device 302 during capture such that the video appears to have been captured from an image capture device 302 with less motion. The visual content captured by the image capture device 302 may be cropped to generate stabilized visual content.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or the position sensor 308, and/or facilitate transfer of information from the image sensor 306 and/or the position sensor 308 to another device/component. The processor 310 may be remote from the processor 11 or local to the processor 11. One or more portions of the processor 310 may be part of the processor 11 and/or one or more portions of the processor 10 may be part of the processor 310. The processor 310 may include and/or perform one or more functionalities of the processor 11 shown in FIG. 1.

For example, the processor 310 may determine stabilization performance information for the visual content captured by the image capture device 302. The stabilization performance information may characterize an extent to which desired stabilization is able to be performed using the visual content. For example, footage within the visual content may be too shaky and the desired stabilization may not be achievable using the visual content. Based on the stabilization performance information, the processor 310 may effectuate one or more changes in stabilization for the visual content. A change in stabilization for the visual content may include one or more of change in capture of the visual content (e.g., how visual content is captured by the image capture device 302), change in stabilization of the visual content (e.g., how/which stabilization technique/algorithm is applied to the visual content), and/or other changes in stabilization for the visual content.

Referring back to FIG. 1, the processor 11 (or one or more components of the processor 11) may be configured to obtain information to facilitate changing stabilization of videos. Obtaining information may include one or more of accessing, acquiring, analyzing, determining, examining, identifying, loading, locating, opening, receiving, retrieving, reviewing, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor, a position sensor) and/or one or more software components (e.g., software running on a computing device).

The video information component 102 may be configured to obtain video information and/or other information. Obtaining video information may include one or more of accessing, acquiring, analyzing, determining, examining, identifying, loading, locating, opening, receiving, retrieving, reviewing, storing, and/or otherwise obtaining the video information. The video information component 102 may obtain video information from one or more hardware components (e.g., an image sensor) and/or one or more software components (e.g., software running on a computing device).

Video information may define a video. The video information component 102 may obtain video information defining a video while the video is being captured by an image capture device. The video information component 102 may obtain video information defining a video after the video has been captured and stored in memory (e.g., the electronic storage 13).

In some implementations, the video information component 102 may obtain video information based on user interaction with a user interface/application (e.g., video editing application, video player application), and/or other information. For example, a user interface/application may provide option(s) for a user to select one or more videos that are to be stabilized and/or played. The video information defining the video may be obtained based on the user's selection of the video content through the user interface/application. Other selections of video for retrieval of video information are contemplated.

The video may include video content captured by an image capture device during a capture duration. The video content may have a progress length. The progress length of the video content may correspond to the capture duration for the video. The progress length of the video content may be determined based on the capture duration. The progress length of the video content may be same as the capture duration, shorter than the capture duration (e.g., playback rate of the video content is faster than the capture rate of the video content), and/or longer than the capture duration (e.g., playback rate of the video content is slower than the capture rate of the video content).

The video content may include visual content of one or more scenes captured by an image capture device during the capture duration. A scene may refer to a place and/or a location in which the image capture device is located while capturing visual content. A scene may include one or more portions of a place and/or a location at which the image capture device is directed during capture of the visual content. A scene may include one or more portions of a place and/or a location that are within the field of view of the image capture device during capture of the visual content. A scene may include static things (e.g., environment, non-moving objects) and/or dynamic things (e.g., moving objects). The video content may include visual content captured at different moments within the capture duration. The visual content may be viewable as a function of progress through the progress length. The visual content may have a field of view, such as the field of view 305 shown in FIG. 3.

The video content may include other content, such as audio content. Audio content may be captured during capture of the visual content (e.g., recording of sound captured with the images/video frames) and/or may be captured separately from the capture of the visual content (e.g., song/music provide accompaniment for the playback of the images/video frames, sound recorded before/after capture of the images/video frames). Audio content may include audio/sound captured (e.g., by sound sensor(s), microphone(s)) with the capture of the visual content and/or audio/sound provided as an accompaniment for the visual content. Audio content may include one or more of voices, activities, songs, music, and/or other audio/sounds. For example, audio content may include sounds captured by a single sound sensor or an array of sound sensors. The sound sensor(s) may receive and convert sounds into output signals. The output signals may convey sound information and/or other information. The sound information may define audio content in one or more formats, such as WAV, MP3, MP4, RAW. Audio content may include audio/sound generated by one or more computing devices, such as procedural audio. Audio content may be synchronized with the visual content. For example, audio content may include music, song, and/or soundtrack, and the visual content of the video content may be synchronized with music, song, and/or soundtrack.

The stabilization performance component 104 may be configured to determine stabilization performance information for the visual content and/or other information. The stabilization performance information may characterize an extent to which desired stabilization is able to be performed using the visual content and/or other information. An extent to which desired stabilization is able to be performed using the visual content may refer to how well the visual content has been, is being, and/or may be processed to achieve the desired stabilization. Visual content may be stabilized to provide a smoother view of the captured visual content. A desired stabilization may refer to a targeted stabilization of the visual content and/or other stabilization of the visual content. A targeted stabilization may refer to a stabilization to be achieved and/or set up as a stabilization goal. A targeted stabilization may be specified by one or more stabilization parameters, stabilization defaults, user inputs, and/or other information. For example, the desired stabilization may be determined based on one or more of strength of stabilization, stabilization constraints (e.g., keeping an object within the punchout, restricting the movement of the punchout), stabilization algorithm, and/or other information.

In some implementations, the stabilization performance information may be determined as quantitative and/or qualitative measurement of how well the visual content has been, is being, and/or may be processed to achieve the desired stabilization. For example, the stabilization performance information may include and/or may be determined as one or more of stabilization score, stabilization level, stabilization percentage, and/or other quantitative and/or qualitative measurement of stabilization performance. The stabilization performance information may include assessment of visual content from a stabilization (e.g., electronic image stabilization) perspective. The stabilization performance information may include assessment of how well stabilization is, may be, and/or has been performed on the visual content. The stabilization performance information may include assessment of the stabilization performance on the output of the stabilization algorithm (stabilized visual content)—assessment of how well stabilization has been, is being, and/or may be performed on the visual content. The stabilization performance information may characterize how well the stabilized visual content has been, is being, may be generated from the visual content.

In some implementations, the stabilization for the visual content may be performed using one or more punchouts of the visual content and/or other information. Stabilization of visual content may include using smaller spatial extents of the visual content to provide a punchout view of the visual content that creates a more stable view than when viewing the entirety of the visual content. A punchout of the visual content may refer to an output of one or more portions of the visual content for presentation (e.g., current presentation, future presentation based on video generated using the punchout). A punchout of the visual content may refer to extents of the visual content that is obtained for viewing and/or extraction. A punchout of the visual content may include extents of the visual content within one or more viewing windows. The extents of the visual content viewable/extracted within the viewing window may be used to provide views of different spatial extents of the visual content.

For example, the visual content may include a field of view, and the punchout of the visual content may include the entire extent of the visual content (the visual content within the entire field of view) or one or more extents of the visual content (the visual content within one or more portions of the field of view). A viewing window may define extents of the visual content to be included within a punchout of the visual content as the function of progress through the progress length/capture duration of the visual content. A viewing window may correspond to the entire duration of the progress length/capture duration or for one or more portions (e.g., portions including moments of interest) of the progress length/capture duration. The punchout of the visual content may be presented on one or more displays, included in one or more videos, and/or otherwise used to stabilize the visual content.

In some implementations, location of the viewing window within the field of view of the visual content may be determined based on positions (e.g., rotational positions, translational positions) of the image capture device during the capture duration and/or other information. The punchout of the visual content may include one or more spatial extents of the visual content as a function of progress through the progress length of the visual content to compensate for different positions (translational positions and/or rotational positions) of the image capture device during the corresponding moments within the capture duration.

A viewing window may define one or more extents of the visual content. A viewing window may define extents of the visual content to be included within stabilized visual content as the function of progress through the progress length of the visual content. A viewing window may define which portions of the visual content are included within the stabilized visual content at different moment within the progress length. Inclusion of the extents of the visual content defined by the viewing window within the stabilized visual content may effectuate stabilization of the visual content. For example, a viewing window may define which spatial portions of the visual content captured by the image capture device during the capture duration is presented on a display and/or included within stabilized visual content. Stabilized visual content may be generated as outputs of portions of the visual content captured by the image capture device, with the outputted portions including extent(s) of the visual content within the punchout/viewing window. Inclusion of the extent(s) of the visual content within the punchout/viewing window may effectuate stabilization of the visual content via selective cropping.

A viewing window may be located within the field of view of the visual content. Location of the viewing window within the field of view of the visual content may be determined based on positions (e.g., rational positions, translational positions, changes in positions) of the image capture device during the capture duration and/or other information. For example, the location of the viewing window within the field of view of the visual content may change as a function of progress through the progress length of the visual content based on rotational positions of the image capture device and/or changes in rotational positions (motion) of the image capture device at different moments within the capture duration (as a function of progress through the capture duration). A viewing window may be characterized by viewing directions, viewing sizes (e.g., viewing zoom, viewing magnification), viewing rotations, and/or other information. Determining the location of the viewing window based on the positions of the image capture device may include determining one or more of viewing directions, viewing sizes, viewing rotations, and/or other characteristics of the viewing window.

A viewing direction may define a direction of view for visual content. A viewing direction may define the angle/visual portion of the visual content at which the viewing window may be directed. Changes in the viewing direction as the function of progress through the progress length may effectuate movement (e.g., panning) of the viewing window within the field of view of the visual content. For example, a viewing direction may be defined based on rotation about an axis that defines lateral movement of the viewing window (e.g., yaw), rotation about an axis that defines vertical movement of the viewing window (e.g., pitch), and/or rotation about other axes. The yaw and pitch values of the viewing direction may determine the location of the viewing window within captured images/video frames.

A viewing size may define a size of the viewing window. A viewing size may define a size (e.g., size, magnification, viewing angle) of viewable extents of visual content. A viewing size may define the dimensions of the viewing window. In some implementations, a viewing size may define different shapes of the viewing window/viewable extents. For example, a viewing window may be shaped as a rectangle, a triangle, a circle, and/or other shapes. A viewing size may define different aspect ratios of the viewing window (e.g., 4:3 aspect ratio, 16:9 aspect ratio, 1:1 aspect ratio).

A viewing rotation may define a rotation of the viewing window. A viewing rotation may define one or more rotations of the viewing window about one or more axis. For example, a viewing rotation may be defined based on rotation about an axis corresponding to a viewing direction (e.g., roll). Changes in the viewing rotation as the function of progress through the progress length may effectuate rotation of the viewing window within the field of view of the visual content.

Stabilization of visual content may be performed based on placement of the viewing window within the field of view of the visual content. The placement of the viewing window may compensate for the motion of the image capture device during the capture duration. For example, a viewing window having a smaller size than the field of view of the visual content may be used to provide a punchout of the visual content. The punchout (cropped view) may be moved within the field of view to provide a stabilized view of the visual content.

The viewing window may be oriented with respect to the field of view of the visual content to provide a punchout of the visual content that is stable with respect to prior and/or next punchout of the visual content. For example, the viewing window may be oriented with respect to the field of view of images/video frames captured by the image capture device to provide a punchout of the images/video frames such that the presented content appears to have been captured with a stable/more stable image capture device (e.g., a punchout of a video frame being stable/more stable with a punchout of the preceding video frame and/or a subsequent video frame).

Figure 4:
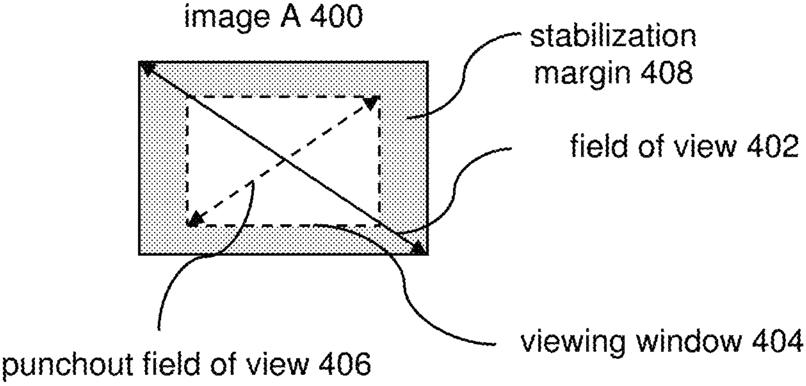
FIG. 4 illustrates example orientations of viewing windows with respect to images.
Figure 4:
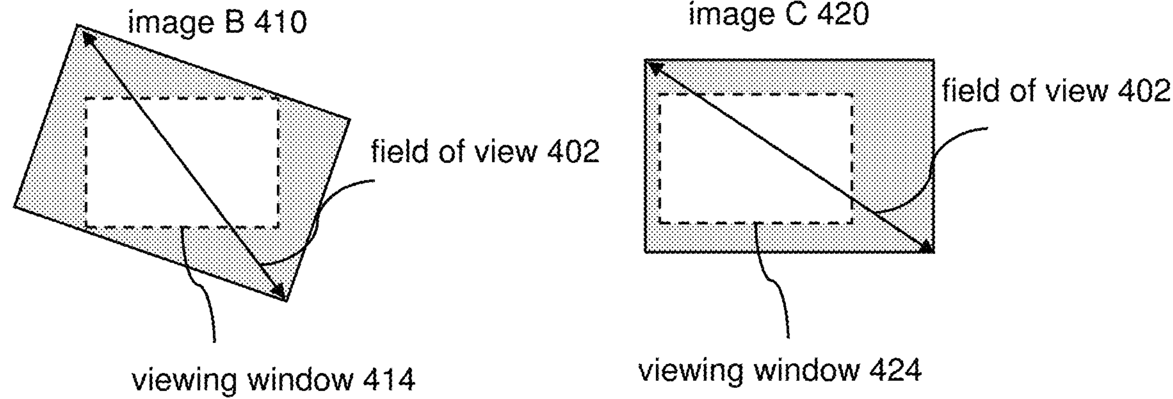

For example, FIG. 4 illustrates example orientations of viewing windows 404, 414, 424 with respect to images 400, 410, 420. The images 400, 410, 420 may have a field of view 402. The viewing windows 404, 414, 424 may have a punchout field of view 406. The images 400, 410, 420 may include capture of a scene within an angle defined by the field of view 402. The viewing windows 404, 414, 424 may provide a punchout of the images 400, 410, 420 to be used for video stabilization. The punchout field of view 406 of the viewing windows 404, 414, 424 may be smaller than the field of view 402 of the images 400, 410, 420. The difference between the field of view 402 and the punchout field of view 406 may define a stabilization margin 408 within which the viewing window 404 may move with respect to the image A 400/field of view 402. The stabilization margin 408 may specify how much the viewing window 404 may move while remaining inside the field of view 402 of the visual content included within the image A 402 (e.g., crop constraint).

The viewing window 404, 414, 424 may be placed within the field of view 402 to perform video stabilization. For example, the viewing window 414 may be rotated with respect to the field of view 402 of the image B 410 while not going beyond the pixels captured within the image B 410. The viewing window 424 may be laterally moved with respect to the field of view 402 of the image C 420 while not going beyond the pixels captured within the image C 420. The placements of the viewing window 404, 414, 424 may be determined based on the positions/motions of the image capture device when the images 400, 410, 420 were captured to stabilize the visual content.

For instance, the viewing window 414 may be oriented with respect to the field of view 402 of the image B 410 to provide a punchout of the image B 410 that is stable with respect to a prior and/or next punchout of the images (e.g., stable with the punchout of the image A 400 using the viewing window 404 for the image A 400). Similarly, the viewing window 424 may be oriented with respect to the field of view 402 of the image C 420 to provide a punchout of the image C 420 that is stable with respect to a prior and/or next punchout of the images (e.g., stable with the punchout of the image B 410 using the viewing window 414 for the image B 410).

Figure 5A:
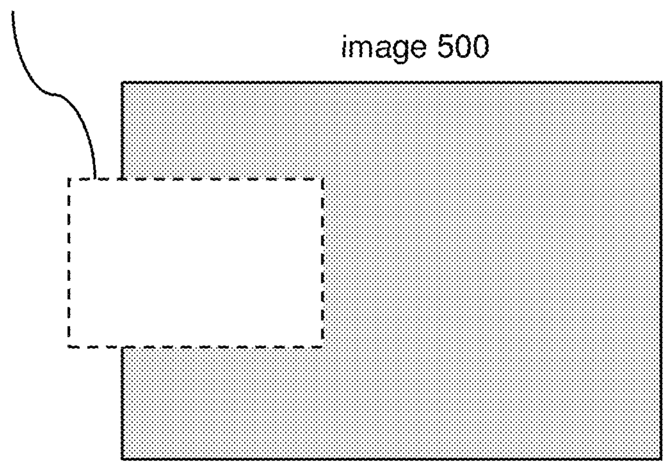
FIG. 5A illustrates an example desired orientation of a viewing window with respect to an image for stabilization.

The field of view of the visual content may be insufficient to achieve desired stabilization for the visual content. The field of view of the visual content may not provide sufficient stabilization margin 408 to compensation for the motion of the image capture device. For example, FIG. 5A illustrates an example desired orientation of a viewing window with respect to an image 500 for stabilization. The image 500 may include a video frame of a video, and the desired stabilization for the video may include removal/elimination of motion in the video due to rotation of the image capture device during capture of the video. To compensate for the motion of the image capture device during capture of the image 500 (e.g., motion of the image capture device between the moment the image capture device captured the video frame preceding the image 500 and the image 500) and perform the desired stabilization of a video including the image 500, the punchout of the image 500 may need to include visual content within the a desired viewing window 502. However, the desired viewing window 502 may extend beyond the field of view of the image 500 and violate the stabilization margin of the image 500. The desired viewing window 502 extending beyond the field of view of the image 500 may be referred to a stabilization constraint violation.

In some implementations, the placement of the viewing window within the visual content of an image may be bounded by a virtual boundary within the field of view of the visual content (e.g., virtual crop constraint). For example, a stabilization constraint may require that the translational and/or rotational motion of the viewing window between subsequent images/video frames be limited to one or more extents (e.g., limitations on extent of changes in rotational and/or rotational positions of the viewing window), and/or otherwise constrain how the viewing window may be placed within the field of view of the visual content. For example, stabilization parameters for the visual content may place limits on in what directions and/or rotations the viewing window may be placed within the field of view of the visual content. Stabilization parameters may restrict the placement of the viewing window using one or more virtual boundaries and/or limit how much the direction and/or rotation of the viewing window may change between images/video frames (e.g., limitations on changes in relative positions of the viewing window as a function of progress through a capture duration).

A stabilization constraint may require that the viewing window respect the one or more stabilization parameters for the visual content. The stabilization constraint may be violated based on the viewing window not respecting one or more constraints for stabilization of the visual content. For example, the stabilization constraint may be violated based on the viewing window extending beyond the field of view of the visual content, the viewing window extending beyond a virtual boundary, the motion of the viewing window being greater than maximum allowed motion for stabilization, and/or other information. The stabilization constraint may be satisfied based on the viewing window respecting the constraint(s) for stabilization of visual content and/or other information. Other stabilization constraints are contemplated.

Figure 5B:
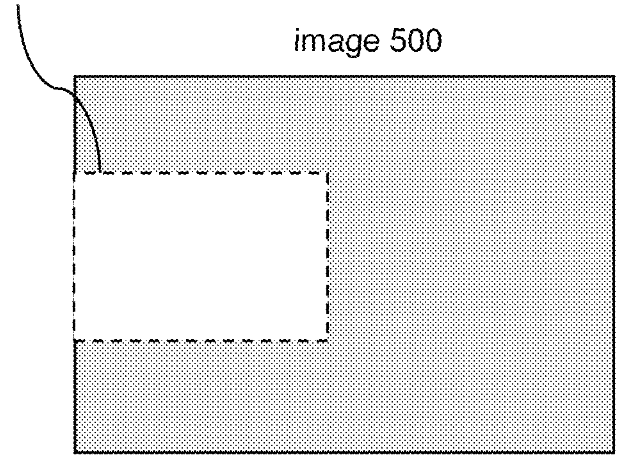
FIG. 5B illustrates an example utilized orientation of a viewing window with respect to an image for stabilization.

The stabilization of the video may need to be adjusted in response to the stabilization constraint violation. For example, referring to FIG. 5A, based on the desired viewing window 502 extending beyond of the field of view of the image 500, the placement of the viewing window may be adjusted so that so that the punchout of the image 500 does not extend beyond the field of view of the image 500. For example, FIG. 5B illustrates an example utilized orientation of a viewing window with respect to an image for stabilization. Rather than using the desired viewing window 502 (shown in FIG. 5A), the stabilization of the video may be performed using a punchout of the visual content of the image 500 within a utilized viewing window 504. Stabilization performed using the utilized viewing window 504 may not achieve the desired stabilization. For example, the stabilization of the visual content using the utilized viewing window 504 may result in the output (stabilized visual content) including more motion than the desired stabilization. The stabilization of the visual content using the utilized viewing window 504 may not fully compensate for the motion of the image capture device.

Figure 6:
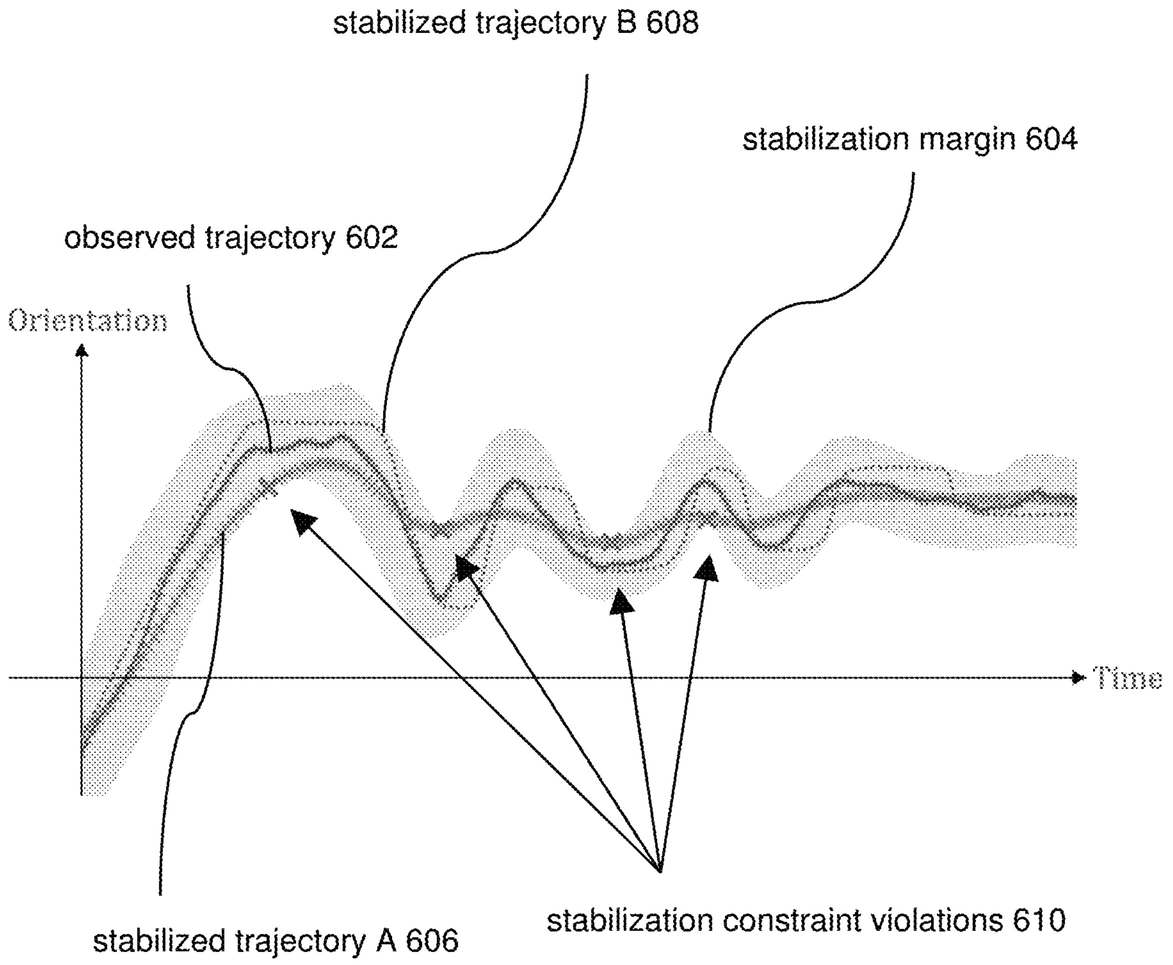
FIG. 6 illustrates example observed trajectory, stabilization margin, and stabilized trajectories.

FIG. 6 illustrates example observed trajectory 602, stabilization margin 604, stabilized trajectory A 606, and stabilized trajectory B 608. An observed trajectory may refer to one or more paths and/or progression of positions followed/experienced by the image capture device during the capture duration. An observed trajectory may reflect positions of the image capture device at different moments within the capture duration. The positions of the image capture device may include rotational positions (e.g., rotations about one or more axis of the image capture device) and/or translational positions of the image capture device. An observed trajectory of the image capture device during the capture duration may be determined based on the position information characterizing specific translational and/or rotational positions of the image capture device and/or changes in translational and/or rotational positions of the image capture device as a function of progress through the capture duration, and/or other information.

For example, the observed trajectory 602 in FIG. 6 may reflect yaw orientation (e.g., yaw rotational position) of the image capture device with respect to a yaw axis of the image capture device. Other types of trajectory (e.g., pitch trajectory, roll trajectory, translational trajectory) are contemplated. Generating a video including visual content (e.g., of image(s), of video frame(s), of video(s)) captured along the observed trajectory 602 may be undesirable. For example, generating a video by outputting the images captured along the observed trajectory 602 may result in a video with footage that is shaky and/or that appears to include unintended camera motion. For instance, sharp/quick changes in the yaw angle positions of the image capture device may result in abrupt changes in the direction of visuals within the video (e.g., quick left or right camera motion). Sharp/quick changes in the yaw angle positions of the image capture device may result in a shaky footage.

The observed trajectory 602 may be stabilized to generate one or more stabilized trajectories. A stabilized trajectory may refer to one or more paths and/or progression of (stabilized) positions from which punchout of the viewing window is determined. The path(s) and/or progression of stabilized position(s) may be used in determining which portions of the visual content (punchouts) are included in stabilized video. The placement of the viewing window within the visual content (e.g., the orientation of the viewing window with respect to the field of view of the visual content) may be determined based on the stabilized trajectory. The placement of a viewing window for the visual content with respect to the field of view of the visual content captured at a moment may be determined based on the corresponding stabilized position (rotational position, translational position) within the stabilized trajectory at the moment and/or other information.

For example, a stabilized trajectory may reflect stabilized positions of a (virtual) image capture device at different moments within the capture duration. The stabilized positions may reflect actual and/or virtual positions of the image capture device at different moments within the capture duration. An actual position may refer to a position that was taken by the image capture device during visual content capture. A virtual position may refer to a position that was not taken by the image capture device during visual content capture. A virtual position may be offset (rotationally and/or translationally) from the actual position of the image capture device.

A stabilized trajectory may have smoother changes in the positions (rotational positions, translational positions) of the image capture device than the observed trajectory. A stabilized trajectory may have less jitters (slight irregular movement/variation), less abrupt changes, and/or less discontinuous changes in the positions (rotational positions, translational positions) of the image capture device than the observed trajectory. The stabilized trajectory having smoother changes in positions than the observed trajectory may include high frequency changes in the positions (rotational positions, translational positions) of the image capture device in the observed trajectory being removed from the stabilized trajectory. That is, the stabilized trajectory may not include and/or may have fewer high frequencies changes in rotational and/or translational positions of the image capture device than the observed trajectory.

Difference in positions of the stabilized trajectory from the observed trajectory may indicate how the viewing window for the punch out of the visual content is to be placed within the field of view of the visual content to stabilize the visual content. For example, the observed trajectory 602 may be stabilized to generate the stabilized trajectory A 606 and the stabilized trajectory B 608. The stabilized trajectories 606, 608 may be generated through use of different stabilization algorithms, different stabilization parameters, and/or other information. The stabilized positions of the stabilized trajectories 606, 608 may be used to determine which portions of the visual content (punchouts) may be used to stabilize the visual content. The placement of the viewing window within the visual content may be determined based on the stabilized positions of the stabilized trajectories 606, 608. The stabilized positions of the stabilized trajectories 606, 608 may be used to determine how the viewing window should be oriented with respect to the field of view of the visual content (e.g., how the punchouts for the visual content may be laterally, vertically, and/or rotationally positioned with respect to the field of view of the visual content).

Large difference between the positions of the observed trajectory and the stabilized trajectory may result in violation of one or more stabilization constraints (e.g., viewing window extending beyond the field of view of the visual content/virtual boundary of the visual content). For example, referring to FIG. 6, the amount by which a stabilized trajectory may deviate from the observed trajectory 602 while respecting the stabilization constraint(s) may be shown by a stabilization margin 604. A stabilized trajectory moving past the stabilization margin 604 may result in violation of one or more stabilization constraint(s).

For example, a stabilized trajectory moving past the stabilization margin 604 may result in the viewing window extending beyond the field of view of the visual content (included within images/video frames) and the punchout not including sufficient information to properly stabilize the visual content. The viewing window extending beyond the field of view of the visual content may result in one or more portions of the punchout missing pixels from which the stabilized visual content may be generated. For example, referring to FIG. 5A, the portion of the desired viewing window 502 that extends beyond the field of view of the image 500 may not include any pixels from which the stabilized visual content may be generated. Such placement of the viewing window may result in defects/artifacts within the stabilized visual content, such as black pixels, warping, and/or other defects/artifacts.

The stabilized trajectory may be adjusted to avoid violation of the stabilization constraint(s). Adjustment of the stabilized trajectory to avoid violation of the stabilization constraint(s) may result in the stabilization of the visual content not fully compensating for the motion of the image capture device during visual content capture and the stabilized visual content including more motion than desired. Adjustment of the stabilized trajectory to avoid violation of the stabilization constraint(s) may result in the stabilization of the visual content not achieving the desired stabilization.

For example, referring to FIG. 6, the stabilized trajectory A 606 may violate one or more stabilization constraints four times within the progress length of the visual content (indicated by stabilization constraint violations 610). The stabilized trajectory A 606 may be adjusted at and/or around the stabilization constraint violations 610 so that the stabilized trajectory A 606 does not move past the stabilization margin 604. Adjustment of the stabilized trajectory A 606 to avoid violation of the stabilization constraint(s) may result in the stabilization of the visual content based on the stabilized trajectory A 606 not fully compensating for the motion of the image capture device during visual content capture and the stabilized visual content including more motion than desired. Adjustment of the stabilized trajectory A 606 to avoid violation of the stabilization constraint(s) may result in the stabilization of the visual content based on the stabilized trajectory A 606 not achieving the desired stabilization.

In some implementations, the stabilization performance information may be determined based on an extent to which desired stabilization is able to be performed using the visual content and/or other information. To perform the desired stabilization, the punchout may need to be moved within the visual content to compensate for motion of the image capture device during capture of the visual content. The desired stabilization may not be performed (achieved) if the motion of the punchout extends beyond the field of view of the visual content, such as shown in FIG. 5A.

In some implementations, the extent to which the desired stabilization is able to be performed using the visual content may include a number of instances in which desired stabilization requires the viewing window to extend beyond the field of view of the visual content. For example, the stabilization performance information may be determined based how many times over the progress length of the visual content the desired viewing window extends beyond the field of view of the visual content (violates stabilization constraint(s)), such as shown in FIGS. 5A and 6. The number of instances in which desired stabilization requires the viewing window to extend beyond the field of view of the visual content may be expressed in terms of total number and/or a frequency with which the desired stabilization requires the viewing window to extend beyond the field of view of the visual content. For example, the extent to which the desired stabilization is able to be performed using the visual content may include a frequency (the number of stabilization constraint violations during a portion of the progress length) with which the desired stabilization requires the viewing window to extend beyond the field of view of the visual content. Counting the number of stabilization violations may be used to assess whether sufficient visual content has been, is being, and/or may be captured to achieve the desired stabilization. For instance, counting the number of stabilization violations may be used to assess whether the stabilization margin is large enough to achieve the desired stabilization.

In some implementation, the number of instances in which desired stabilization requires the viewing window to extend beyond the field of view of the visual content may be expressed based on a sliding window over the progress length of the visual content—the sliding window may define portions of a particular size of the progress length and the stabilization performance may indicate the number of instances in which desired stabilization requires the viewing window to extend beyond the field of view of the visual content within the sliding window. Rather than counting the number of stabilization constraint violations over fixed windows dividing the progress length, the stabilization constraint violations may be tracked to determine the number of stabilization constraint violations within a window that moves across the progress length.

In some implementations, the extent to which the desired stabilization is able to be performed using the visual content may include a spatial amount by which the desired stabilization requires the viewing window to extend beyond the field of view of the visual content. For example, the stabilization performance information may be determined based how much the desired viewing window extends beyond the field of view of the visual content (violates stabilization margin), such as shown in FIG. 5A.

In some implementations, the extent to which the desired stabilization is able to be performed using the visual content may be determined based on both the number of instances in which desired stabilization requires the viewing window to extend beyond the field of view of the visual content and the spatial amount by which the desired stabilization requires the viewing window to extend beyond the field of view of the visual content. For example, both the frequency with which the desired stabilization requires the viewing window to extend beyond the field of view of the visual content and the spatial amounts by which desired viewing window extends beyond the field of view of the visual content may be used in determining the stabilization performance. The frequency and the spatial amount of violations may be weighed equally or differently to determine the stabilization performance information.

In some implementations, the stabilization performance information for the visual content may be determined based on an orientation of the viewing window with respect to the field of view of the visual content. For example, the distance between the viewing window and the center of the field of view of the visual content may be used to determine the stabilization performance information. As another example, the angular difference between the viewing window and the horizon of the field of view of the visual content may be used to determine the stabilization performance information. The stabilization performance information may be determined based on lateral, vertical and/or rotational orientation of the viewing window with respect to the field of view of the visual content.

In some implementations, the stabilization performance information may be determined based on rotational positions of the image capture device during the capture duration and/or other information. The rotational positions of the image capture device during the capture duration may be used to determine overlaps between fields of view of the visual content as a function of progress length of the visual content. For example, the rotational positions of the image capture device during the capture duration may be used to determine to what extent video frames of a video include capture of the same field of view of a scene. Greater rotational motion (changes in rotational motion) of the image capture device during the capture duration may result in smaller overlaps in depictions of the scene within the captured visual content (e.g., adjacent video frames) and smaller rotational motion of the image during the capture duration may result in larger overlaps in depictions of the scene within the captured visual content. The rotational positions of the image capture device as a function of progress through the capture duration may be used to determine to the extent to which the desired stabilization is able to be performed using the visual content.

The change component 106 may be configured to effectuate one or more changes in stabilization for the visual content based on the stabilization performance information and/or other information. Effectuating a change in the stabilization for the visual content may include automatically changing the stabilization for the visual content based on the stabilization performance information, providing one or more options to a user to change the stabilization for the visual content based on the stabilization performance information, and/or other changing of the stabilization for the visual content.

A change in stabilization for the visual content may include one or more of change in capture of the visual content (e.g., how visual content is captured by an image capture device), change in stabilization of the visual content (e.g., how/which stabilization technique/algorithm is applied to the visual content), and/or other changes in stabilization for the visual content. For example, a change in stabilization for the visual content may include change in how an image capture device operates to capture the visual content. Such a change in stabilization for the visual content may allow the stabilization performance information to be used during capture of the visual content to adjust one or more image capture settings in/near real time. The change in stabilization for the visual content may allow the desired stabilization to be performed.

A change in the stabilization for the visual content may include a change in the field of view of the visual content that is captured by the image capture device. During capture of visual content, the stabilization performance information may be analyzed to determine whether visual content with sufficient field of view is being captured to perform the desired stabilization. Based on the field of view not being large enough to perform the desired stabilization, the field of view (e.g., zoom) with which visual content is captured by the image capture device may be changed. For instance, based on the stabilization performance information indicating that the field of view is too small to perform the desired stabilization, the field of view of the visual content may be increased. The amount by which the field of view is increased may be determined based on the image capture device (e.g., zoom factor of the image capture device), the stabilization performance information (e.g., the frequency and/or spatial amount by which the desired stabilization requires the viewing window to extend beyond the field of view of the visual content), and/or other information.

In some implementations, the field of view of the visual content that is captured by the image capture device may be changed through different image sensor utilizations of the image capture device. For example, an image sensor of the image capture device may receive light within a field of view of an optical element. The image sensor may generate output signals conveying information that define visual content within a smaller field of view. Utilization of the image sensor to generate images with smaller field of view than possible may provide resource savings (e.g., reduce processing/power/memory requirement to generate output signals). Based on the stabilization performance information indicating that the field of view is too small to perform the desired stabilization, the utilization of the image sensor may be changed to generate images with larger field of view. Such utilization of the image sensor may increase resource computation of the image sensor in return for higher stabilization performance.

A change in the stabilization for the visual content may include a change in one or more stabilization parameters. A stabilization parameter may refer to a condition and/or a factor that defines and/or sets the conditions for stabilizing the visual content. A change in a stabilization parameter may entirely change the stabilization of the visual content and/or change one or more portions of the stabilization of the visual content. A change in a stabilization parameter may change the desired stabilization of the visual content. For example, a stabilization parameter may include one or more of a stabilization technique/algorithm, a parameter for the stabilization technique/algorithm, and/or other conditions/factors for stabilizing the visual content. For instance, a change in the stabilization for the visual content may include a change which stabilization technique/algorithm is applied to the visual content. A change in the stabilization for the visual content may include a change in one or more parameter for the stabilization technique/algorithm applied to the visual content. Such a change in stabilization for the visual content may allow the stabilization performance information to be used to increase the performance of the stabilization.

For example, a stabilization technique/algorithm with highest stabilization performance (stabilization technique/algorithm with no/fewest stabilization constraint violations, stabilization technique/algorithm requiring the viewing window to extend beyond the field of view of the visual content by smallest spatial amount) may be used to stabilize the visual content. As another example, the parameters for the applied stabilization technique/algorithm may be adjusted to increase the stabilization performance (e.g., reduce the number of stabilization constraint violations, reduce the spatial amount by which stabilization technique/algorithm requires the viewing window to extend beyond the field of view of the visual content).

For example, a parameter for a stabilization technique/algorithm may include condition(s) and/or factor(s) that define how the viewing window/punchout of the visual content is determined and/or how the stabilized trajectory is generated. For example, a change in the stabilization for the visual content may include a change in the viewing window. A change in the viewing window may include a change in a size, a shape, and/or other characteristics of the viewing window. For instance, the size of the viewing window may be decreased to increase the stabilization margin. The change in the size of the viewing window may simulate change in zoom in the stabilized visual content. The shape of the viewing window may be changed (e.g., from a wide viewing window providing a wide field of view punchout of the visual content to a linear viewing window providing a linear field of view punchout of the visual content) to increase the stabilization margin. The change in the shape of the viewing window may simulate a change in projection (e.g., from a wide-field of view projection to a rectilinear projection) in the stabilized visual content.

A change in the stabilization for the visual content may include a change in the stabilized trajectory generation. A change in the stabilized trajectory generation may include a change in a filter/smoothing factor used to smooth the observed trajectory into the stabilized trajectory, a filter width for the filter/smoothing factor, and/or other settings for the stabilized trajectory generation. For instance, different filters/smoothing factors and/or filter width may be used to generate different stabilized trajectories with different curvatures. Different filters/smoothing factors and/or filter width may be used to change how closely the stabilized trajectory follows the observed trajectory or how much the stabilized trajectory deviates from the observed trajectory. For instance, use of smaller filter width may result in generation of stabilized trajectory that more closely follows the observed trajectory, which may reduce the number of stabilization constraint violation. Use of larger filter width may result in generation of stabilized trajectory that deviates more from the observed trajectory, which may increase the number of stabilization constraint violation. The filter width may be decreased to increase the stabilization performance. Other changes in the stabilization for the visual content are contemplated.

In some implementations, the processor 11 may represent multiple processors, and at least one of the processors may be a remote processor located remotely from the housing of the image capture device (e.g., the image capture device 302). One or more of the functionalities of the components 102, 104, 106 may be performed by the image capture device 302 (e.g., by the processor 310) and/or by a remote processor. For example, determination of the stabilization performance information (functionality of the stabilization performance component 104) and/or change in stabilization for the visual content (functionality of the change component 106) may be performed by the processor 310 during capture of the visual content to change stabilization for the visual content during capture of the visual content. As another example, stabilization performance determination and/or change in stabilization may be performed by the remote processor during and/or post capture of the visual content by the image capture device.

In some implementations, the visual content may not be stabilized in/near real time. For example, the image capture device may not have sufficient resource to stabilize the visual content in real-time and/or may be devoting its resources to other tasks. The stabilization/change in stabilization of the visual content may be performed by the image capture device once sufficient resource becomes available. The stabilization/change in stabilization of the visual content may be performed by the remote processor. For example, the remote processor may be one or more processors of a remote computing device (e.g., mobile device, desktop, server), and the remote processor may receive visual content captured by the image capture device. The remote computing device (software running on the remote computing device) may apply the stabilization/change the stabilization post capture of the visual content by the image capture device. The post-capture stabilization of the visual content may be performed by the remote processor responsive to reception of the visual content (e.g., reception of video information), responsive to user/system command to stabilize the visual content, responsive to the visual content being opened for playback, and/or responsive to other conditions.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
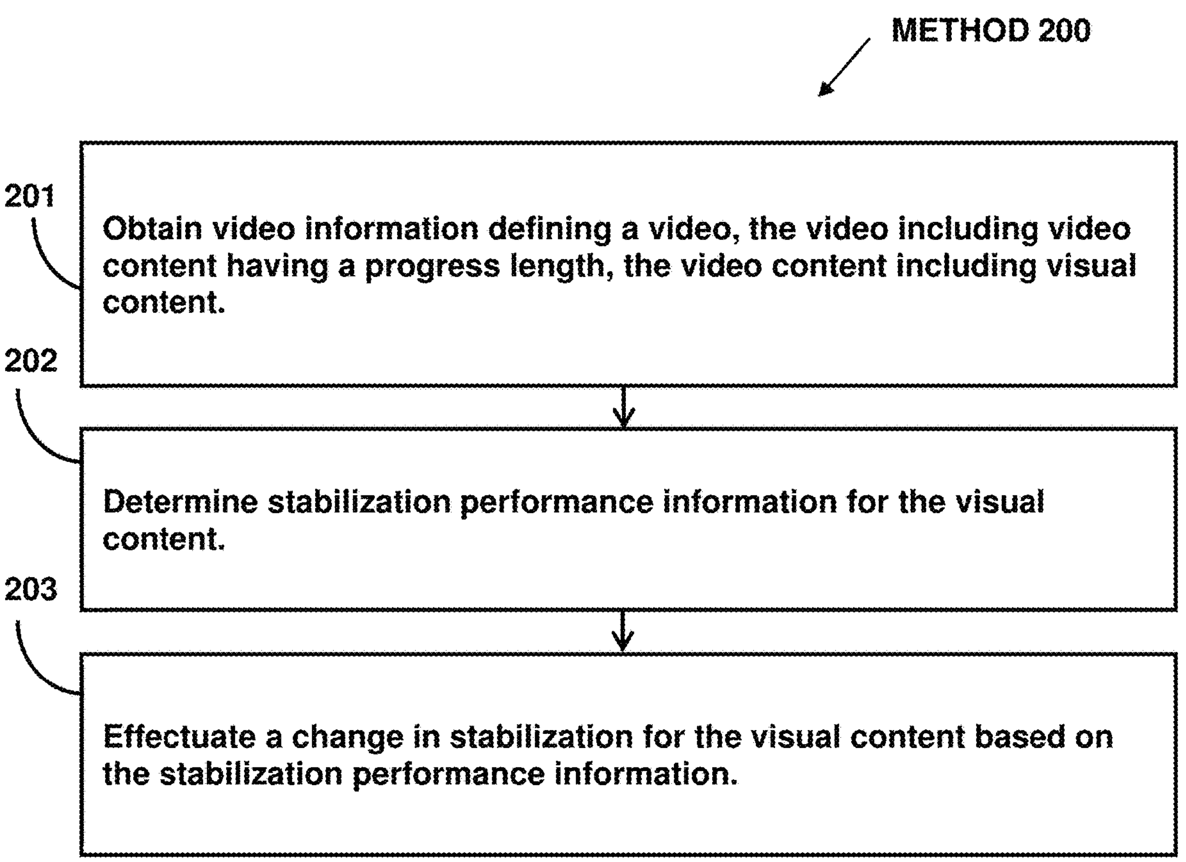
FIG. 2 illustrates an example method for changing stabilization of videos.

FIG. 2 illustrates method 200 for changing stabilization of videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, video information and/or other information may be obtained. The video information may define a video. The video may include video content having a progress length. The video content may include visual content captured by an image capture device during a capture duration. The visual content may have a field of view. In some implementations, operation 201 may be performed by a processor component the same as or similar to the video information component 102 (Shown in FIG. 1 and described herein).

At operation 202, stabilization performance information for the visual content may be determined. The stabilization performance information may characterize an extent to which desired stabilization is able to be performed using the visual content. In some implementations, operation 202 may be performed by a processor component the same as or similar to the stabilization performance component 104 (Shown in FIG. 1 and described herein).

At operation 203, a change in stabilization for the visual content may be effectuated based on the stabilization performance information and/or other information. In some implementations, operation 203 may be performed by a processor component the same as or similar to the change component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device for changing stabilization of videos, the image capture device comprising:

a housing;

an image sensor carried by the housing and configured to generate a visual output signal conveying visual information based on light that becomes incident thereon, the visual information defining visual content having a field of view;

an optical element carried by the housing and configured to guide light to the image sensor; and one or more physical processors carried by the housing and configured by machine-readable instructions to:

assess performance of a stabilization for the visual content, the stabilization for the visual content performed using a punchout of the visual content within a viewing window, the performance of the stabilization for the visual content assessed based on a number of times a stabilization margin for the visual content is violated by the stabilization for the visual content; and effectuate a change in the stabilization for the visual content based on the assessment of the performance of the stabilization for the visual content, wherein the change in the stabilization for the visual content reduces the number of times the stabilization margin for the visual content is violated by the stabilization for the visual content.

2. The image capture device of claim 1, wherein the stabilization margin being violated by the stabilization for the visual content includes the viewing window being placed beyond the field of view of the visual content by the stabilization for the visual content.

3. The image capture device of claim 2, wherein the violation of the stabilization margin for the visual content is determined based on an orientation of the viewing window with respect to the field of view of the visual content.

4. The image capture device of claim 3, wherein the performance of the stabilization for the visual content is assessed further based on a spatial amount by which the viewing window extends beyond the field of view of the visual content.

5. The image capture device of claim 1, wherein the change in the stabilization for the visual content includes a change in generation of a stabilized trajectory of the image capture device for placement of the viewing window within the field of view of the visual content.

6. The image capture device of claim 1, wherein the change in the stabilization for the visual content includes an increase in the field of view of the visual content that is captured by the image capture device.

7. The image capture device of claim 1, wherein the change in the stabilization for the visual content includes a change in size of the viewing window.

8. The image capture device of claim 1, wherein the change in the stabilization for the visual content includes a change in shape of the viewing window.

9. The image capture device of claim 8, wherein the change in the shape of the viewing window changes projection of the visual content from a wide-field of view projection to a rectilinear projection.

10. A method for changing stabilization of videos, the method performed by an image capture device including an image sensor, an optical element, and one or more processors, the image sensor configured to generate a visual output signal conveying visual information based on light that becomes incident thereon, the visual information defining visual content having a field of view, the optical element configured to guide light to the image sensor, the method comprising:

assessing performance of a stabilization for the visual content, the stabilization for the visual content performed using a punchout of the visual content within a viewing window, the performance of the stabilization for the visual content assessed based on a number of times a stabilization margin for the visual content is violated by the stabilization for the visual content; and effectuating a change in the stabilization for the visual content based on the assessment of the performance of the stabilization for the visual content, wherein the change in the stabilization for the visual content reduces the number of times the stabilization margin for the visual content is violated by the stabilization for the visual content.

11. The method of claim 10, wherein the stabilization margin being violated by the stabilization for the visual content includes the viewing window being placed beyond the field of view of the visual content by the stabilization for the visual content.

12. The method of claim 11, wherein the violation of the stabilization margin for the visual content is determined based on an orientation of the viewing window with respect to the field of view of the visual content.

13. The method of claim 12, wherein the performance of the stabilization for the visual content is assessed further based on a spatial amount by which the viewing window extends beyond the field of view of the visual content.

14. The method of claim 10, wherein the change in the stabilization for the visual content includes a change in generation of a stabilized trajectory of the image capture device for placement of the viewing window within the field of view of the visual content.

15. The method of claim 10, wherein the change in the stabilization for the visual content includes an increase in the field of view of the visual content that is captured by the image capture device.

16. The method of claim 10, wherein the change in the stabilization for the visual content includes a change in size of the viewing window.

17. The method of claim 10, wherein the change in the stabilization for the visual content includes a change in shape of the viewing window.

18. The method of claim 17, wherein the change in the shape of the viewing window changes projection of the visual content from a wide-field of view projection to a rectilinear projection.

19. An image capture device for changing stabilization of videos, the image capture device comprising:

a housing;

an image sensor carried by the housing and configured to generate a visual output signal conveying visual information based on light that becomes incident thereon, the visual information defining visual content having a field of view;

an optical element carried by the housing and configured to guide light to the image sensor; and one or more physical processors carried by the housing and configured by machine-readable instructions to:

assess performance of a stabilization for the visual content, the stabilization for the visual content performed using a punchout of the visual content within a viewing window, the performance of the stabilization for the visual content assessed based on a number of times a stabilization margin for the visual content is violated by the stabilization for the visual content; and effectuate a change in the stabilization for the visual content based on the assessment of the performance of the stabilization for the visual content, the change in the stabilization for the visual content including a change in generation of a stabilized trajectory of the image capture device for placement of the viewing window within the field of view of the visual content, wherein the change in the stabilization for the visual content reduces the number of times the stabilization margin for the visual content is violated by the stabilization for the visual content.

20. The image capture device of claim 19, wherein the change in the stabilization for the visual content further includes a change in shape of the viewing window that changes projection of the visual content from a wide-field of view projection to a rectilinear projection.

* * * * *